United States Patent
Kiyo et al.

(10) Patent No.: US 10,037,595 B2
(45) Date of Patent: Jul. 31, 2018

(54) IMAGE PROCESSING DEVICE AND IMAGE PROCESSING METHOD

(71) Applicants: FUJITSU TEN LIMITED, Kobe-shi, Hyogo (JP); TOYOTA JIDOSHA KABUSHIKI KAISHA, Toyota-shi, Aichi-ken (JP)

(72) Inventors: Kouei Kiyo, Kobe (JP); Satoru Matsuyama, Kobe (JP); Shinichi Moriyama, Kobe (JP); Goro Asai, Toyota (JP); Masato Okuda, Okazaki (JP); Yohei Satomi, Okazaki (JP); Yuka Shidochi, Toyota (JP)

(73) Assignees: FUJITSU TEN LIMITED, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 15/170,361

(22) Filed: Jun. 1, 2016

(65) Prior Publication Data
US 2016/0364842 A1    Dec. 15, 2016

(30) Foreign Application Priority Data
Jun. 10, 2015    (JP) ................. 2015-117401

(51) Int. Cl.
  *G06K 9/36*    (2006.01)
  *G06T 3/40*    (2006.01)
  (Continued)

(52) U.S. Cl.
  CPC ............. *G06T 3/4038* (2013.01); *B60R 1/00* (2013.01); *G06T 3/0068* (2013.01);
  (Continued)

(58) Field of Classification Search
  CPC ............... B60R 1/00; B60R 2300/105; B60R 2300/303; B60R 2300/602; H04N 7/181;
  (Continued)

(56) References Cited

U.S. PATENT DOCUMENTS

| 6,912,001 B2 * | 6/2005 | Okamoto | B60R 1/00 348/148 |
| 2011/0063444 A1 * | 3/2011 | Okamoto | B60R 1/00 348/148 |

FOREIGN PATENT DOCUMENTS

| EP | 1 157 890 A1 | 11/2001 |
| EP | 1 170 697 A2 | 1/2002 |

(Continued)

OTHER PUBLICATIONS

Oct. 13, 2016 Extended European Search Report issued in European Patent Application No. 16172535.3.

*Primary Examiner* — Daniel Mariam
(74) *Attorney, Agent, or Firm* — Oliff PLC (57) ABSTRACT

An image processing device according to an embodiment includes a display control unit, a pattern specification unit, and a pattern collating unit. The display control unit generates a composite image that is a surrounding image of a vehicle viewed from a virtual viewpoint, based on images input from in-vehicle cameras, and displays thereof on a display unit. The pattern specification unit specifies an image pattern to be output as the input image among image patterns, for each in-vehicle camera. The pattern collating unit determines whether all image pattern responses from the in-vehicle cameras match with the image pattern. The display control unit displays a certain preparation image on the display unit when the display switching condition to the composite image is satisfied, and displays the composite image thereon instead of the preparation image, when the
(Continued)

pattern collating unit determines that all the image pattern responses match with the image pattern.

17 Claims, 7 Drawing Sheets

(51) Int. Cl.
*H04N 7/18* (2006.01)
*B60R 1/00* (2006.01)
*G06T 3/00* (2006.01)
*H04N 5/232* (2006.01)
*H04N 5/247* (2006.01)

(52) U.S. Cl.
CPC ......... *H04N 5/23293* (2013.01); *H04N 5/247* (2013.01); *H04N 7/181* (2013.01); *B60R 2300/105* (2013.01); *B60R 2300/303* (2013.01); *B60R 2300/602* (2013.01)

(58) Field of Classification Search
CPC .. H04N 5/23293; H04N 5/247; G06T 3/4038; G06T 3/0068
USPC .................................................. 382/284, 282
See application file for complete search history.

(56) References Cited

FOREIGN PATENT DOCUMENTS

| | | |
|---|---|---|
| JP | 2001-334870 A | 12/2001 |
| JP | 2002-027446 A | 1/2002 |
| JP | 2012-214083 A | 11/2012 |
| JP | 2015-74258 A | 4/2015 |

\* cited by examiner

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2015-117401, filed on Jun. 10, 2015, the entire contents of which are incorporated herein by reference.

FIELD

The embodiment discussed herein is directed to an image processing device and an image processing method.

BACKGROUND

A device has been developed that generates a composite image indicating the surrounding state of a vehicle viewed from a certain virtual viewpoint, such as from directly above the vehicle and from the rear of the vehicle, by combining camera images obtained from a plurality of in-vehicle cameras installed in the vehicle, and that displays the composite image on a display.

For example, Japanese Laid-open Patent Publication No. 2002-027446 discloses a technology that specifies an image area for each of the in-vehicle cameras, and each of the in-vehicle cameras segments the specified image area from a camera image for output.

However, the conventional technology has a possibility that an unintended composite image including image data, of an area different from the specified image area may be displayed on the display, until all pieces of the specified image data are obtained.

SUMMARY

An image processing device according to an embodiment includes a display control unit, a pattern specification unit, and a pattern collating unit. The display control unit generates a composite image that is a surrounding image of a vehicle viewed from a virtual viewpoint, based on an input image input from each of a plurality of in-vehicle cameras, and that causes a display unit to display the composite image. The pattern specification unit specifies an image pattern to be output as the input image among a plurality of image patterns for each of the in-vehicle cameras. The pattern collating unit determines whether all of a plurality of image pattern responses transmitted from the in-vehicle cameras match with the image pattern. The display control unit causes the display unit to display a certain preparation image when a display switching condition to the composite image is satisfied, and causes the display unit to display the composite image instead of the preparation image, when the pattern collating unit determines that all of the image pattern responses match with the image pattern.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

An embodiment of an image processing device and an image processing method disclosed in the present embodiment will now be described with reference to the accompanying drawings. It is to be understood that the present invention is not limited to the embodiment.

Figure 1:
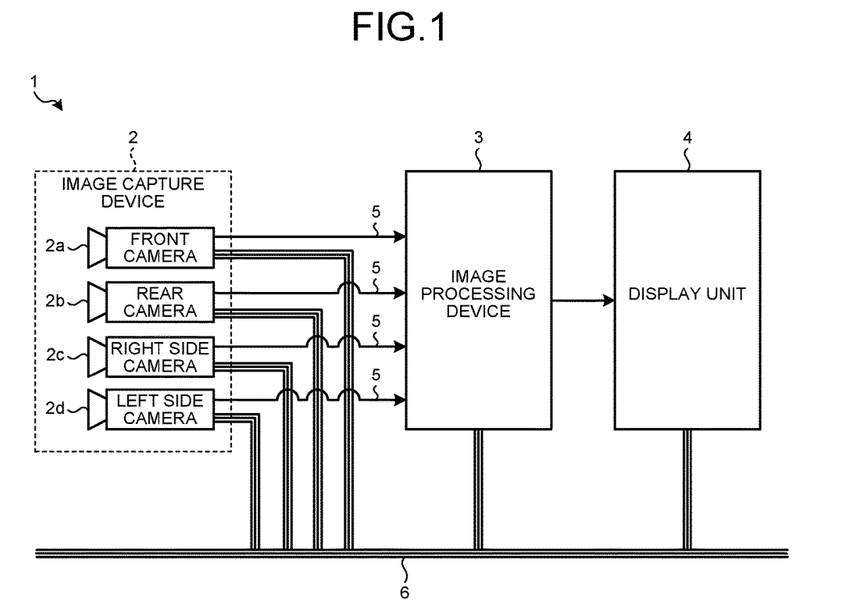
FIG. 1 is a configuration example of an image processing system according to the present embodiment.
Figure 2:
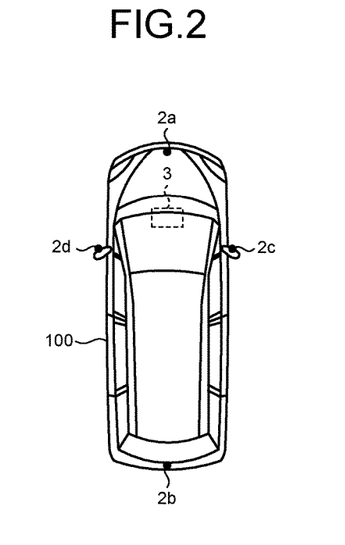
FIG. 2 is an arrangement example of in-vehicle cameras.

FIG. 1 is a configuration example of an image processing system according to the present embodiment. FIG. 2 is an arrangement example of in-vehicle cameras.

As illustrated in FIG. 1, an image processing system 1 according to the present embodiment includes an image capture device 2, an image processing device 3, and a display unit 4.

The image capture device 2 includes a front camera 2a, a rear camera 2b, a right side camera 2c, and a left side camera 2d. As illustrated in FIG. 2, these in-vehicle cameras 2a to 2d are respectively disposed at the front, rear, right, and left sides of a vehicle 100.

Each of the in-vehicle cameras 2a to 2d includes an image capturing element such as a charge coupled device (CCD) and a complementary metal oxide semiconductor (CMOS), and captures a surrounding image of the vehicle 100 using the image capturing element. More specifically, the in-vehicle cameras 2a to 2d respectively capture images of the front, rear, right, and left sides of the vehicle 100.

Each of the in-vehicle cameras 2a to 2d includes a wide-angle lens such as a fisheye lens. Thus, each of the in-vehicle cameras 2a to 2d has an angle of view equal to or more than 180 degrees. Consequently, by using these in-vehicle cameras 2a to 2d, it is possible to capture an image of the entire surroundings of the vehicle 100.

The images captured by the in-vehicle cameras 2a to 2d are output to the image processing device 3 through output lines 5. The output lines 5 are a National Television System Committee (NTSC) cable, for example.

For example, the number of pixels of each of the in-vehicle cameras 2a to 2d is a million, which is larger than the maximum number of pixels (such as 0.3 million) that can be output through each of the output lines 5. Thus, in the image processing system 1, the image processing device 3, which will be described below, specifies an image area to be output to the image processing device 3 for each of the in-vehicle cameras 2a to 2d. Then, each of the in-vehicle cameras 2a to 2d segments the image area specified by the image processing device 3 from the captured image, and outputs the image to the image processing device 3.

The image area is specified through a communication line 6. For example, the communication line 6 is a vehicle local area network (LAN) such as a controller area network (CAN) bus. The image processing device 3 is also connected to the display unit 4, various electronic control units (ECUs), which are not illustrated, and the like, through the communication line 6. The image processing device 3 can transmit and receive various pieces of information to and from the display unit 4 and the ECUs.

Hereinafter, an image captured by each of the in-vehicle cameras 2a to 2d (image before being segmented) is referred to as a "camera image", and an image output to the image processing device 3 from each of the in-vehicle cameras 2a to 2d (image after being segmented) is referred to as an "input image".

The image processing device 3 generates a virtual viewpoint image, which is a surrounding image of the vehicle 100 viewed from a virtual viewpoint, by carrying out a coordinate conversion process on an input image input from each of the in-vehicle cameras 2a to 2d.

In the coordinate conversion process, for example, the image processing device 3 projects (maps) a captured image on a certain projection surface. A virtual viewpoint image is an image of an area included in a predetermined viewing angle viewed from a virtual viewpoint, in the input image projected on the certain projection surface.

For example, the image processing device 3 stores therein a table indicating the corresponding relation between the position of data included in the input image and the position of the certain projection surface. Thus, by using the table, the image processing device 3 can project the data included in the input image on the position corresponding to the certain projection surface.

For example, the certain projection surface has a substantially hemispherical shape (such as a shape of a bowl), and an area at the center (such as the bottom portion of the bowl) corresponds to the position of the vehicle 100. For example, the outside of the position of the vehicle 100 (such as a portion excluding the bottom portion of the bowl) corresponds to the surrounding area of the vehicle 100. For example, the certain projection surface may also be a flat surface instead of a curved surface.

The image processing device 3 generates a composite image by chroma keying a vehicle image, which is an image of the vehicle 100 viewed from the virtual viewpoint, with the generated virtual viewpoint image, and displays the composite image on the display unit 4.

The display unit 4 includes a liquid crystal display (LCD), and can display a virtual viewpoint screen including the composite image obtained from the image processing device 3. For example, the display unit 4 may be a touch panel type display.

When the screen to be displayed on the display unit 4 is to be switched, for example, from the rear screen and the like to the virtual viewpoint screen, the image processing device 3 sometimes requests each of the in-vehicle cameras 2a to 2d to switch the image area to be output as the input image, so as to obtain an input image suitable for generating a virtual viewpoint image.

However, there may be a time lag from when the image processing device 3 requests each of the in-vehicle cameras 2a to 2d to switch the image area, until when each of the in-vehicle cameras 2a to 2d outputs the input image after being switched. Thus, when the display is switched immediately from the rear screen and the like to the virtual viewpoint screen, there is a possibility that an unintended composite image including the input image (in other words, the input image before being switched) different from the requested input image may be displayed on the display unit 4. Also, because the timing to switch the input image is different for each of the in-vehicle cameras 2a to 2d, there is a possibility that the screen may flicker, because the input image is switched individually, and the composite image is changed frequently.

It is possible to prevent such a situation by first specifying the image area for each of the in-vehicle cameras 2a to 2d, switching the image area, and then switching to the virtual viewpoint screen after a predetermined time has passed. However, even in this case, it is difficult to cope with a case where an unexpected time lag occurs. Also, it is not efficient to wait for a uniform period of time determined in advance.

Thus, in the image processing device 3 according to the present embodiment, when the display is switched from the rear screen and the like to the virtual viewpoint screen, a certain preparation screen is displayed on the display unit 4 before the virtual viewpoint screen is displayed. Then, only when output responses corresponding to the newly specified input image are received from all of the in-vehicle cameras 2a to 2d through the communication line 6, the image processing device 3 causes the display unit 4 to display the virtual viewpoint screen, instead of the preparation screen.

Figure 3:
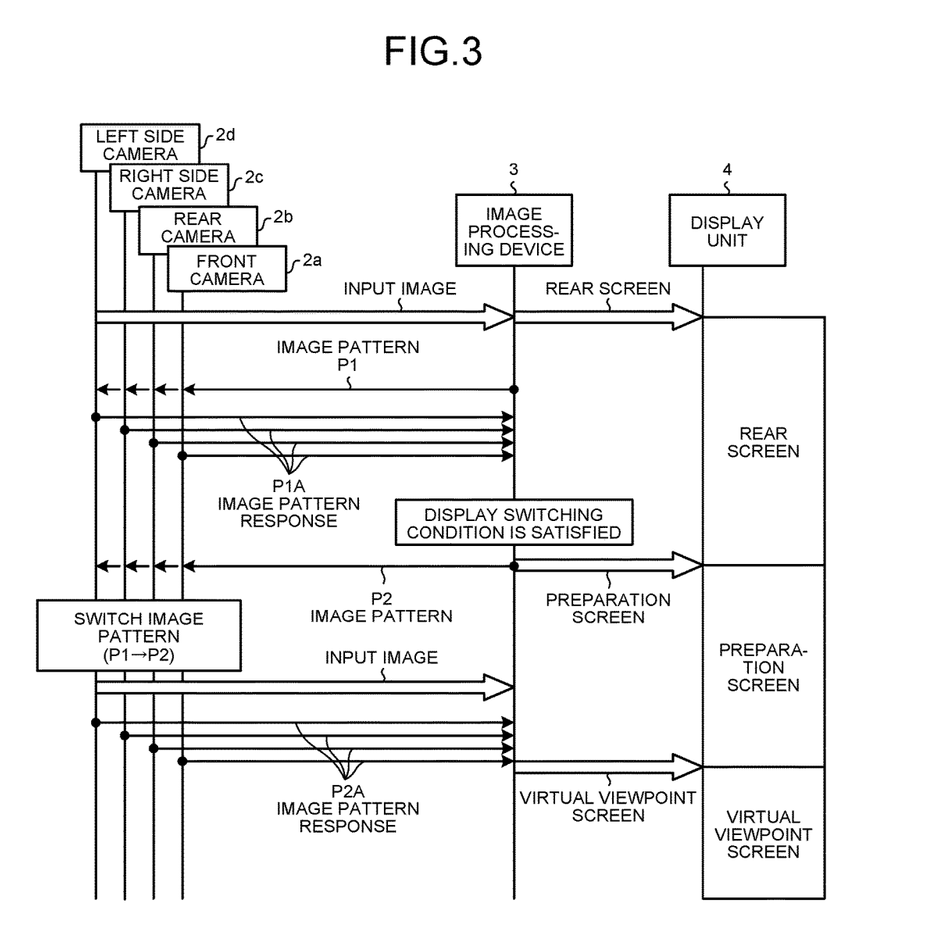
FIG. 3 is a sequence diagram illustrating a timing of switching a screen to be displayed on a display unit.
Figure 4:
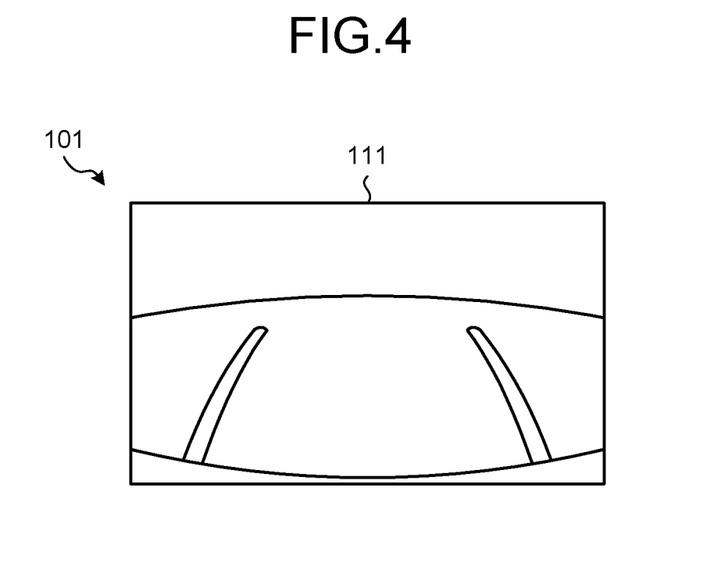
FIG. 4 is an example of a rear screen.
Figure 5:
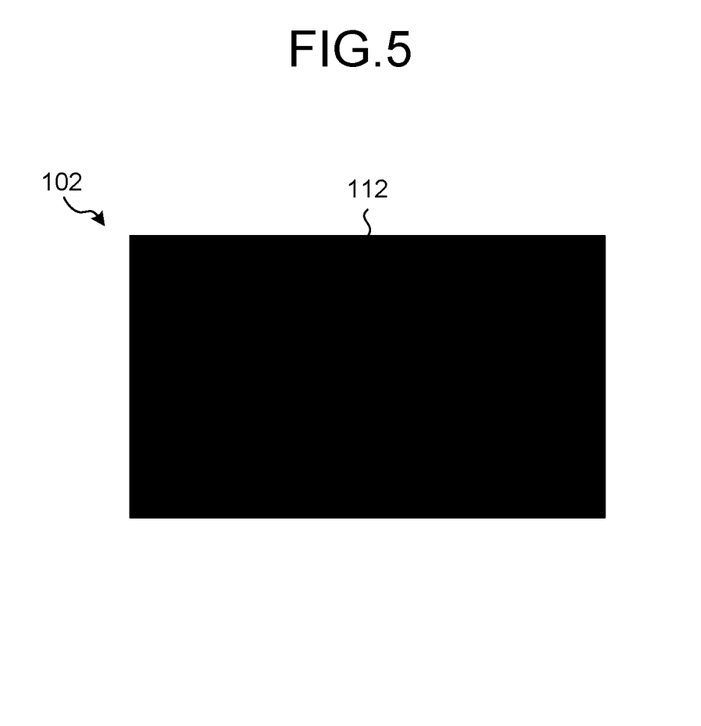
FIG. 5 is an example of a preparation screen.
Figure 6:
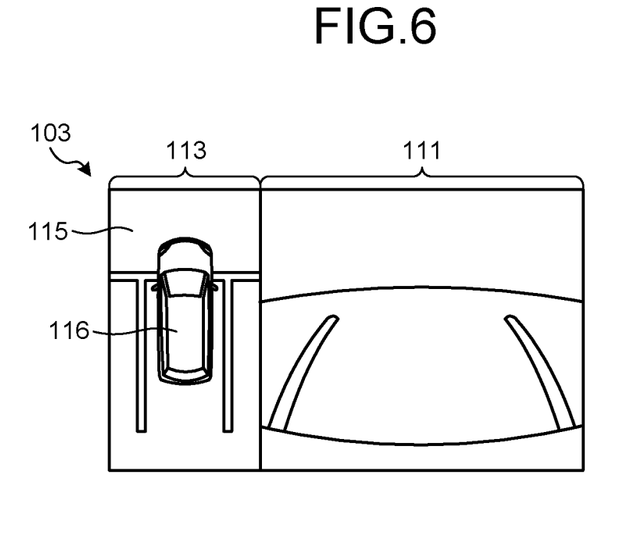
FIG. 6 is an example of a virtual viewpoint screen.

This point will now be described with reference to FIG. 3 to FIG. 6. FIG. 3 is a sequence diagram illustrating a timing of switching a screen to be displayed on the display unit 4. FIG. 4 is an example of a rear screen. FIG. 5 is an example of a preparation screen. FIG. 6 is an example of a virtual viewpoint screen. As an example, FIG. 3 illustrates a sequence diagram when the display is switched from the rear screen to the virtual viewpoint screen.

As illustrated in FIG. 3, the front camera 2a, the rear camera 2b, the right side camera 2c, and the left side camera 2d each output an input image, which is obtained by segmenting a certain area from a camera image, to the image processing device 3. Among the input images obtained from the in-vehicle cameras 2a to 2d, the image processing device 3 generates a rear screen using the input image from the rear camera 2b, and causes the display unit 4 to display the image. As illustrated in FIG. 4, a rear screen 101 is a screen that includes a rear image 111, which is the input image from the rear camera 2b, and that does not include the input images from the other in-vehicle cameras 2a, 2c, and 2d.

The image processing device 3 stores therein a table indicating the corresponding relation between the screen (the rear screen 101 and a virtual viewpoint screen 103, which will be described below) to be displayed on the display unit 4, and the image area to be segmented from the camera image as the input image (hereinafter, referred to as an "image pattern"). Each of the in-vehicle cameras 2a to 2d stores therein a table indicating a corresponding relation between the image area to be segmented from the camera image as the input image and the image pattern.

The image processing device 3 regularly transmits an image pattern corresponding to the screen that is currently displayed on the display unit 4, to each of the in-vehicle cameras 2a to 2d through the communication line 6. Upon receiving the image pattern from the image processing device 3, each of the in-vehicle cameras 2a to 2d transmits an image pattern response corresponding to the input image currently output, to the image processing device 3.

For example, when the rear screen 101 is being displayed, the image processing device 3 transmits an image pattern P1 corresponding to the rear screen 101 to each of the in-vehicle cameras 2a to 2d. When the input image is segmented from the image area corresponding to the image pattern P1, in other words, from the image area corresponding to the rear screen 101, each of the in-vehicle cameras 2a to 2d that received the image pattern P1 transmits an image pattern response P1A to the image processing device 3.

Subsequently, when the display switching condition from the rear screen 101 to the virtual viewpoint screen is satisfied, for example, when a user performs a switching operation to the virtual viewpoint screen, the image processing device 3 first causes the display unit 4 to display a preparation screen.

As illustrated in FIG. 5, a preparation screen 102 is a screen including a preparation image 112. The preparation image 112 is a black monochromatic image, and is stored in advance in a storage unit, which is not illustrated.

In this manner, because a monochromatic image is relatively inconspicuous, when the monochromatic image is used for the preparation image 112, it is less likely to attract attention of a user who is driving, for example, compared to when an image including characters, patterns, and the like is used for the preparation image 112. In particular, as in the present embodiment, when the black monochromatic image is used, it is further less likely to attract attention of the user who is driving. It is to be noted that the preparation image 112 may also be a monochromatic image besides black. Also, the preparation image 112 does not necessarily need to be a monochromatic image.

When the display switching condition from the rear screen 101 to the virtual viewpoint screen is satisfied, the image processing device 3 transmits an image pattern P2 corresponding to the virtual viewpoint screen 103 to each of the in-vehicle cameras 2a to 2d.

For example, as illustrated in FIG. 6, the virtual viewpoint screen 103 is a screen that includes the rear image 111 and a composite image 113. The composite image 113 is an image obtained by chroma keying a vehicle image 116 with a virtual viewpoint image 115 generated based on the input image from each of the in-vehicle cameras 2a to 2d. It is to be noted that the virtual viewpoint screen 103 does not necessarily need to include the rear image 111.

Upon receiving the image pattern P2 from the image processing device 3, each of the in-vehicle cameras 2a to 2d switches the image area to be segmented from the camera screen, from the area corresponding to the image pattern P1, to the area corresponding to the image pattern P2. Each of the in-vehicle cameras 2a to 2d then outputs the input image, which is segmented from the area corresponding to the image pattern P2, to the image processing device 3.

Each of the in-vehicle cameras 2a to 2d then transmits an image pattern response P2A corresponding to the input image being output, to the image processing device 3. When all of the image pattern responses P2A received from the in-vehicle cameras 2a to 2d match with the image pattern P2, the image processing device 3 causes the display unit 4 to display the virtual viewpoint screen 103 instead of the preparation screen 102.

As described above, when the display is switched to the virtual viewpoint screen 103 at the point when the display switching condition is satisfied, there is a possibility that the virtual viewpoint screen 103 including an unintended composite image may be displayed on the display unit 4. However, in the image processing device 3 according to the present embodiment, the preparation screen 102 is displayed on the display unit 4 before the virtual viewpoint screen 103 is displayed, after the display switching condition is satisfied. Thus, it is possible to prevent the virtual viewpoint screen 103 including the unintended composite image 113 from being displayed on the display unit 4.

Figure 7:
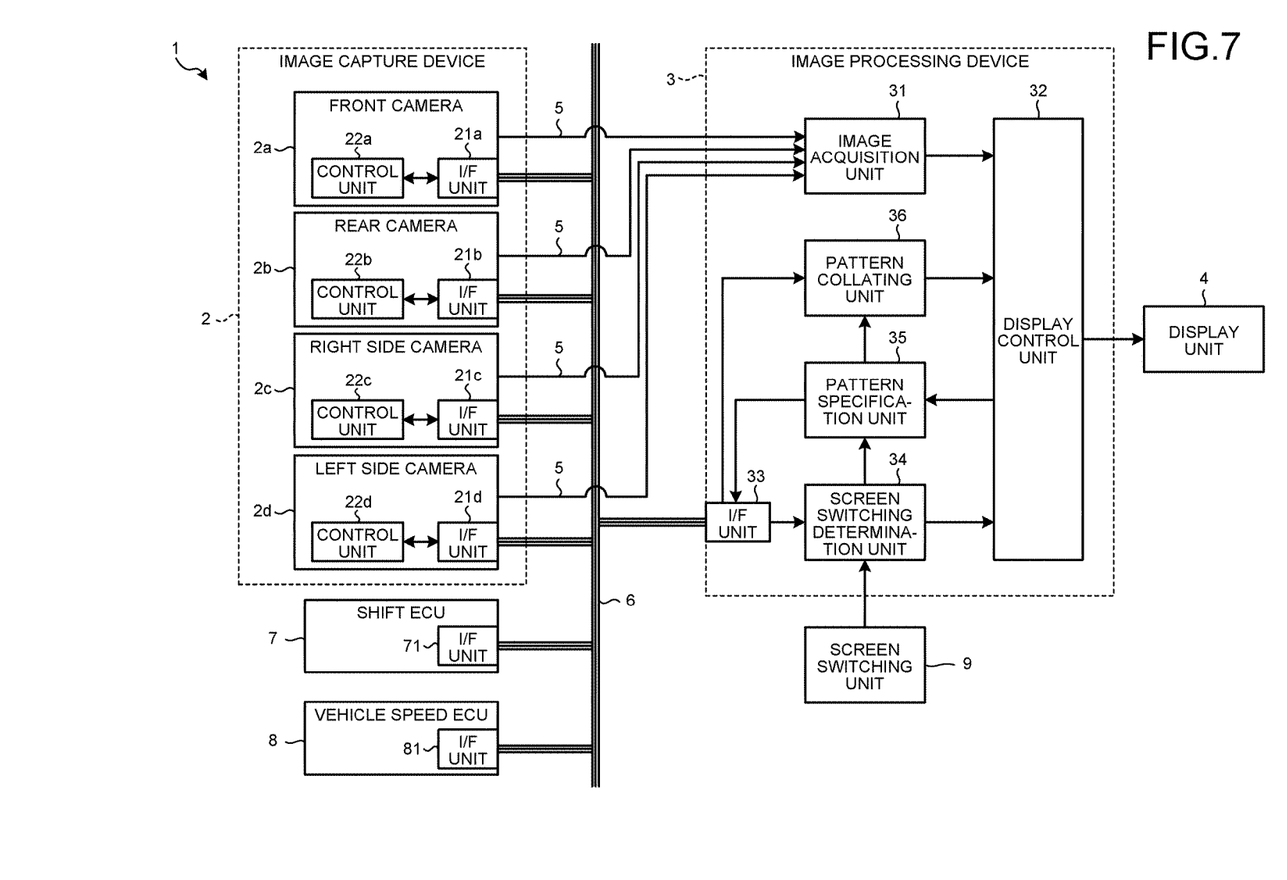
FIG. 7 is a specific configuration example of the image processing system according to the present embodiment.

Next, a specific configuration and operation of the in-vehicle cameras 2a to 2d and the image processing device 3 according to the present embodiment will be described. First, a specific configuration of the in-vehicle cameras 2a to 2d and image processing device 3 will be described with reference to FIG. 7. FIG. 7 is a specific configuration of the image processing system 1 according to the present embodiment. In FIG. 7, constituent elements needed for explaining the features of the image processing system 1 are only illustrated, and the description of general constituent elements is omitted.

As illustrated in FIG. 7, the in-vehicle cameras 2a to 2d respectively include interface (I/F) units 21a to 21d and control units 22a to 22d. For example, each of the I/F units 21a to 21d is an interface for the CAN communication, and transmits and receives various types of data excluding image data to and from the image processing device 3 through the communication line 6.

For example, each of the I/F units 21a to 21d receives an image pattern from the image processing device 3 through the communication line 6, and delivers the image pattern to corresponding one of the control units 22a to 22d. Each of the I/F units 21a to 21d also transmits an image pattern response, which is received from corresponding one of the control units 22a to 22d, to the image processing device 3 through the communication line 6.

The control units 22a to 22d each segment an image area corresponding to the image pattern from the camera image, and output the image area to the image processing device 3 as the input image, through corresponding one of the output lines 5. Each of the control units 22a to 22d also transmits the image pattern response corresponding to the image area segmented from the camera image, to the image processing device 3 through corresponding one of the I/F units 21a to 21d and the communication line 6.

The timing to output and transmit the input image and the image pattern response is not synchronized among the in-vehicle cameras 2a to 2d. In other words, the input image and the image pattern response are output and transmitted from each of the in-vehicle cameras 2a to 2d at different timings.

The image processing device 3 includes an image acquisition unit 31, a display control unit 32, an I/F unit 33, a screen switching determination unit 34, a pattern specification unit 35, and a pattern collating unit 36.

The image acquisition unit 31 acquires an input image from each of the in-vehicle cameras 2a to 2d through corresponding one of the output lines 5. The image acquisition unit 31 also outputs the acquired input images to the display control unit 32.

The display control unit 32 generates various images by using the input images, and causes the display unit 4 to display at least one of the images. For example, the display control unit 32 causes the display unit 4 to display the rear screen 101 (see FIG. 4) using the rear image 111, which is an input image from the rear camera 2b. The display control unit 32 also generates the composite image 113 (see FIG. 6) by performing the coordinate conversion process and the composite process on each of the input images from the in-vehicle cameras 2a to 2d, and causes the display unit 4 to display the virtual viewpoint screen 103 including the composite image 113.

Based on information from the screen switching determination unit 34, which will be described below, the display control unit 32 determines the screen to be displayed on the display unit 4. For example, when the screen switching determination unit 34 outputs information indicating that the screen to be displayed on the display unit 4 is the rear screen 101, the display control unit 32 causes the display unit 4 to display the rear screen 101.

When the screen switching determination unit 34 outputs information indicating that the screen to be displayed on the display unit 4 is the virtual viewpoint screen 103, the display control unit 32 causes the display unit 4 to display the preparation image 112 (see FIG. 5), instead of the virtual viewpoint screen 103. When a notification indicating that all of the image pattern responses transmitted from the in-vehicle cameras 2a to 2d match with the image pattern is received from the pattern collating unit 36, which will be described below, the display control unit 32 causes the display unit 4 to display the virtual viewpoint screen 103.

The display control unit 32 also outputs information indicating the type of the screen currently displayed on the display unit 4, to the pattern specification unit 35, which will be described below. For example, when the rear screen 101 is displayed on the display unit 4, the display control unit 32 outputs information indicating that the screen currently displayed on the display unit 4 is the rear screen 101, to the pattern specification unit 35.

The I/F unit 33 is an interface, for example, for the CAN communication, and transmits and receives various types of data to and from the in-vehicle cameras 2a to 2d and the various ECUs through the communication line 6.

For example, the I/F unit 33 receives shift information indicating the current position of the shift lever of the vehicle 100 from a shift ECU 7 through the communication line 6. The I/F unit 33 also receives vehicle speed information indicating the current speed of the vehicle 100 from a vehicle speed ECU 8 through the communication line 6. The I/F unit 33 then delivers the received shift information and vehicle speed information to the screen switching determination unit 34. The shift ECU 7 and the vehicle speed ECU 8 respectively include I/F units 71 and 81, and transmit and receive various types of information to and from the image processing device 3, through the respective I/F units 71 and 81 as well as the communication line 6.

The I/F unit 33 receives image pattern responses from the in-vehicle cameras 2a to 2d through the communication line 6, and delivers the received image pattern responses to the pattern collating unit 36.

The screen switching determination unit 34 determines whether the display switching condition is satisfied. For example, the screen to be displayed on the display unit 4 is selected corresponding to an input operation by a user through a screen switching switch 9, as well as by the position of the shift lever, the vehicle speed of the vehicle 100, and the like. For example, the input operation of the screen switching switch 9 may be a touch operation on the display unit 4.

For example, when an input operation of switching to the virtual viewpoint screen 103 is carried out through the screen switching switch 9, the screen switching determination unit 34 determines that the display switching condition to the virtual viewpoint screen 103 is satisfied. When the shift information obtained from the shift ECU 7 is changed, for example, from "D" (drive) to "R" (rear), or when the vehicle speed information obtained from the vehicle speed ECU 8 is changed, for example, to 10 km/h, the screen switching determination unit 34 determines that the display switching condition to the virtual viewpoint screen 103 is satisfied.

If it is determined that the display switching condition is satisfied, the screen switching determination unit 34 outputs information indicating the type of the display screen after being switched, to the display control unit 32 and the pattern specification unit 35.

The pattern specification unit 35 specifies the image pattern for each of the in-vehicle cameras 2a to 2d. For example, when the display control unit 32 outputs information indicating that the currently displayed screen is the rear screen 101, the pattern specification unit 35 transmits the image pattern P1 (see FIG. 3) to each of the in-vehicle cameras 2a to 2d through the I/F unit 33 and the communication line 6.

When information indicating the type of the display screen after being switched is obtained from the screen switching determination unit 34, the pattern specification unit 35 carries out a process to determine whether the image pattern needs to be switched.

For example, when the display control unit 32 outputs information indicating that the currently displayed screen is the rear screen 101, and when information indicating that the display screen after being switched is the virtual viewpoint screen 103 is obtained from the screen switching determination unit 34, the pattern specification unit 35 determines that the image pattern needs to be switched (from P1 to P2).

If it is determined that the image pattern needs to be switched, the pattern specification unit 35 transmits the image pattern after being switched to each of the in-vehicle cameras 2a to 2d through the I/F unit 33 and the communication line 6. The pattern specification unit 35 also transmits the image pattern after being switched to the pattern collating unit 36.

On the other hand, if it is determined that there is no need to switch the image pattern, the pattern specification unit 35 outputs the determination result to the pattern collating unit 36.

As described above, the image processing device 3 stores therein a table indicating the corresponding relation between the screen to be displayed on the display unit 4 and the image pattern, and the pattern specification unit 35 performs the determination by using the table.

The pattern collating unit 36 collates the image pattern responses obtained from the in-vehicle cameras 2a to 2d through the I/F unit 33 with the image pattern output from the pattern specification unit 35. The pattern collating unit 36 then determines whether all of the image pattern responses transmitted from the in-vehicle cameras 2a to 2d match with the image pattern.

If it is determined that all of the image pattern responses transmitted from the in-vehicle cameras 2a to 2d match with the image pattern, the pattern collating unit 36 instructs the display control unit 32 to display the virtual viewpoint screen 103 on the display unit 4.

If the image pattern response from at least one of the in-vehicle cameras 2a to 2d does not match with the image pattern, even if the determination process is repeated for predetermined times, the pattern collating unit 36 instructs the display unit 4 to display information that specifies at least one of the in-vehicle cameras 2a to 2d that output the image pattern response that does not match with the image pattern. The pattern collating unit 36 also instructs the display unit 4 to display an alternative virtual viewpoint screen.

When information indicating that there is no need to switch the image pattern is received from the pattern specification unit 35, the pattern collating unit 36 instructs the display control unit 32 to display the virtual viewpoint screen 103 on the display unit 4, without performing the determination process.

Figure 8:
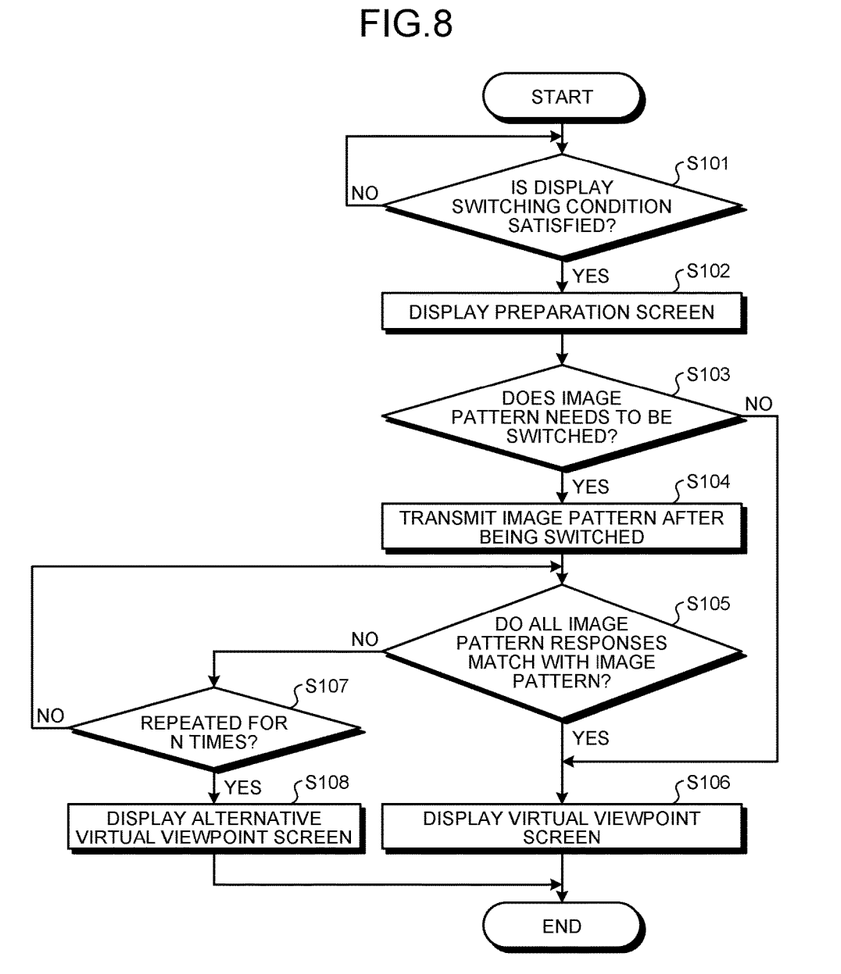
FIG. 8 is a flowchart illustrating a processing procedure executed by an image processing device according to the present embodiment.

Next, a specific operation of the image processing device 3 according to the present embodiment will be described with reference to FIG. 8. FIG. 8 is a flowchart illustrating a processing procedure executed by the image processing device 3 according to the present embodiment. FIG. 8 illustrates a processing procedure of switching the display screen on the display unit 4 to the virtual viewpoint screen 103 or the alternative virtual viewpoint screen.

As illustrated in FIG. 8, the image processing device 3 determines whether the display switching condition is satisfied (Step S101). If it is determined that the display switching condition is satisfied (Step S101: Yes), the image processing device 3 causes the display unit 4 to display the preparation screen 102 (Step S102). If the display switching condition is not satisfied (Step S101: No), the image processing device 3 repeats the determination process at step S101 until the display switching condition is satisfied.

Then, the image processing device 3 determines whether the image pattern needs to be switched (Step S103). If it is determined that the image pattern needs to be switched (Step S103: Yes), the image processing device 3 transmits the image pattern after being switched to each of the in-vehicle cameras 2a to 2d (Step S104).

The image processing device 3 then determines whether all of the image pattern responses transmitted from the in-vehicle cameras 2a to 2d match with the image pattern transmitted at step S104 (Step S105). Then, if it is determined that all of the image pattern responses match with the image pattern (Step S105: Yes), the image processing device 3 causes the display unit 4 to display the virtual viewpoint screen 103 instead of the preparation screen 102 (Step S106), and completes the process.

At step S103, if it is determined that there is no need to switch the image pattern (Step S103: No), the image processing device 3 causes the display unit 4 to display the virtual viewpoint screen 103 (Step S106), and completes the process.

In this manner, if the display switching condition to the virtual viewpoint screen 103 is satisfied (Step S101: Yes), and if the image processing device 3 determines that there is no need to switch the image pattern, in other words, if the image pattern after the display switching condition is satisfied and the image pattern immediately before the display switching condition is satisfied are the same, the image processing device 3 causes the display unit 4 to display the virtual viewpoint screen 103, without performing the determination process at step S105. Thus, it is possible to reduce the display time of the preparation screen 102, in other words, the waiting time until the virtual viewpoint screen 103 is displayed.

At step S105, if the image pattern response from at least one of the in-vehicle cameras 2a to 2d does not match with the image pattern (Step S105: No), the image processing device 3 determines whether the determination process at step S105 has been repeated for N times (N is an integer larger than zero) (Step S107). At this determination process, if it is determined that the determination process at step S105 is not repeated for N times (Step S107: No), the image processing device 3 returns the process to step S105. If it is determined that the determination process at step S105 has been repeated for N times (Step S107: Yes), the image processing device 3 causes the display unit 4 to display the alternative virtual viewpoint screen instead of the preparation screen 102 (Step S108), and completes the process.

Figure 9:
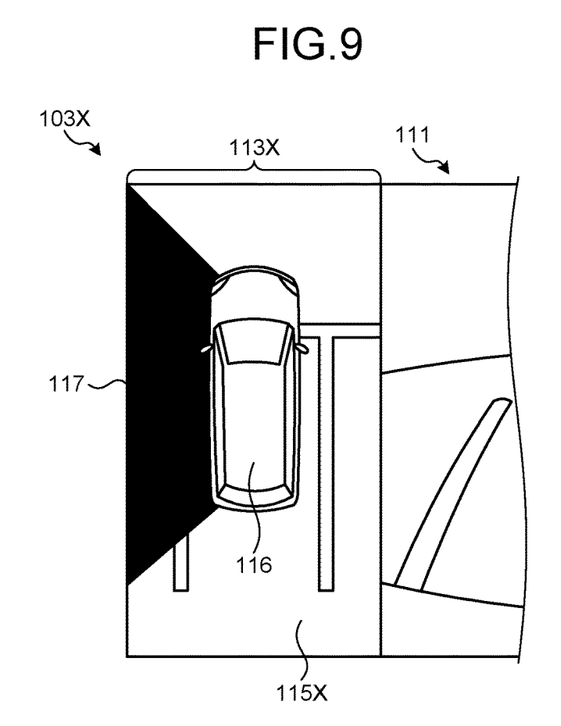
FIG. 9 is an example of an alternative virtual viewpoint screen.

The alternative virtual viewpoint screen will now be described with reference to FIG. 9. FIG. 9 is an example of the alternative virtual viewpoint screen.

As illustrated in FIG. 9, an alternative virtual viewpoint screen 103X is a screen that includes an alternative composite image 113X instead of the composite image 113 in the virtual viewpoint screen 103 (see FIG. 6). When the pattern collating unit 36 instructs the display control unit 32 to display the alternative virtual viewpoint screen on the display unit 4, the display control unit 32 generates the alternative composite image 113X using a certain alternative image 117 instead of the input image that is input from one of the in-vehicle cameras 2a to 2d (here, the left side camera 2d) that output the image pattern response that does not match with the image pattern. The display control unit 32 then causes the display unit 4 to display the alternative composite image 113X.

The image processing device 3 stores the alternative image 117 corresponding to each of the in-vehicle cameras 2a to 2d in the storage unit (not illustrated). The display control unit 32 generates the alternative composite image 113X by extracting the alternative image 117 that corresponds to one of the in-vehicle cameras 2a to 2d that output the image pattern response that does not match with the image pattern, from the storage unit.

In this manner, if the image pattern response obtained from at least one of the in-vehicle cameras 2a to 2d does not match with the image pattern, the display control unit 32 according to the present embodiment generates the alternative composite image 113X using the certain alternative image 117 instead of the input image that is input from one of the in-vehicle cameras 2a to 2d that output the image pattern response that does not match with the image pattern. The display control unit 32 then causes the display unit 4 to display the alternative composite image 113X. Thus, even if an input image different from what is specified is input from one of the in-vehicle cameras 2a to 2d, it is possible to prevent an unintended composite image from being displayed, and present the user with a composite image.

The alternative image 117 may be a black monochromatic image. In this manner, by using the monochromatic image, it is possible to easily distinguish between the portion generated by using the input images from the in-vehicle cameras 2a to 2d and the portion generated by using the alternative image 117, in a virtual viewpoint image 115X. In particular, as the present embodiment, it is possible to clearly distinguish between the two, when the black monochromatic image is used for the alternative image 117. It is to be understood that the alternative image 117 may also be a monochromatic image besides black. Also, the alternative image 117 does not necessarily need to be a monochromatic image.

The alternative composite image 113X includes a composite portion of the alternative image 117 and the input images. For example, the alternative composite image 113X illustrated in FIG. 9 includes a composite portion of the input image from the front camera 2a and the alternative image 117, and a composite portion of the input image from the rear camera 2b and the alternative image 117.

The display control unit 32 may also replace the composite portion of the alternative image 117 and the input image, with the alternative image 117. Consequently, it is possible to clearly distinguish the boundary line between the portion of the virtual viewpoint image generated by only using the input image from each of the in-vehicle cameras 2a to 2d, and the portion generated by using the alternative image 117, in the virtual viewpoint image 115X.

The display control unit 32 may also generate the alternative composite image 113X, by first generating the virtual viewpoint image 115X using all of the input images input from the in-vehicle cameras 2a to 2d, and replacing a part of the virtual viewpoint image 115X with the alternative image 117.

As described above, the image processing device 3 according to the present embodiment includes the display control unit 32, the pattern specification unit 35, and the pattern collating unit 36. The display control unit 32 generates the composite image 113, which is a surrounding image of a vehicle viewed from a virtual viewpoint, based on the input images input from the in-vehicle cameras 2a to 2d, and causes the display unit 4 to display the composite image 113. The pattern specification unit 35 specifies the image pattern to be output as the input image among a plurality of image patterns, for each of the in-vehicle cameras 2a to 2d. The pattern collating unit 36 determines whether all of image pattern responses transmitted from the in-vehicle cameras 2a to 2d match with the image pattern. When the display switching condition to the composite image 113 is satisfied, the display control unit 32 causes the display unit 4 to display a certain preparation image 112 before displaying the composite image 113. If the pattern collating unit 36 determines that all of the image pattern responses match with the image pattern, the display control unit 32 causes the display unit 4 to display the composite image 113 instead of the preparation image 112.

Thus, the image processing device 3 according to the present embodiment can prevent an unintended composite image from being displayed.

Figure 10:
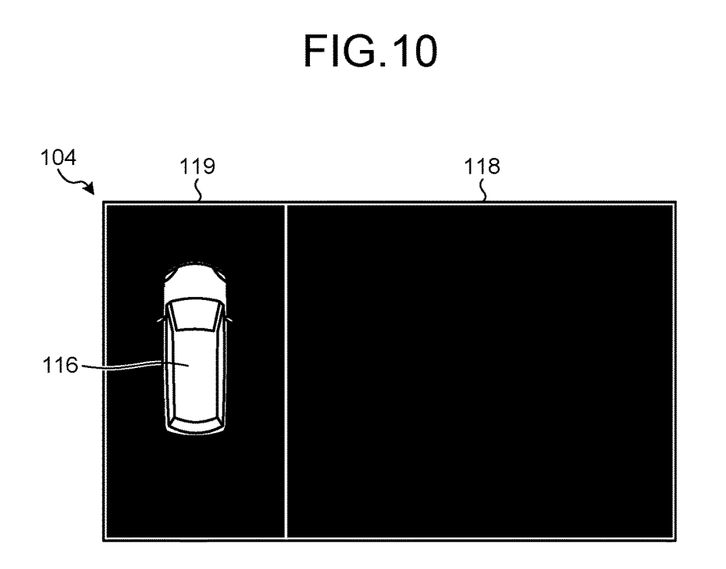
FIG. 10 is an example of a layout image.

In the embodiment, a monochromatic image is used for the preparation image 112. However, the preparation image may also be a layout image of the virtual viewpoint image 115, instead of the monochromatic image. This point will now be described with reference to FIG. 10. FIG. 10 is an example of a layout image.

As illustrated in FIG. 10, a layout image 104 is an image that includes a frame image 118 that indicates the display area of the rear image 111, a frame image 119 that indicates the display area of the composite image 113, and the vehicle image 116. The layout image 104 does not include the rear image 111 and the virtual viewpoint image 115.

In this manner, the display control unit 32 may also cause the display unit 4 to display the layout image 104, which indicates the display position of the composite image 113 in the display area of the display unit 4, as the preparation image. Thus, the user can immediately identify the next screen to be switched.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device,
the image processing device comprising a processor configured to:
specify as an image pattern for each of a plurality of in-vehicle cameras, an image area that is obtained by selecting a certain area from anions image areas of an image captured by the corresponding in-vehicle camera and is to be output as an input image of the corresponding in-vehicle camera;
in response to the image pattern being specified, receive the image areas respectively transmitted from the plurality of in-vehicle cameras along with respective image pattern responses;
generate a composite image that is a surrounding image of a vehicle viewed from a virtual viewpoint, based on the image areas received from the plurality of in-vehicle cameras;
determine whether all of the image pattern responses transmitted from the in-vehicle cameras match with the specified image pattern; and
display a certain preparation image when a display switching condition to the composite image is satisfied, and display the composite image instead of the preparation image, when it is determined that all of the image pattern responses match with the specified image pattern.

2. The image processing device according to claim 1, wherein the processor is further configured to display the composite image without performing the determination, when the image pattern transmitted to each of the in-vehicle cameras after the display switching condition is satisfied, and the image pattern before the display switching condition is satisfied are identical.

3. The image processing device according to claim 2, wherein when at least one of the image pattern responses does not match with the image pattern, the processor is further configured to generate an alternative composite image using a certain alternative image instead of the input image input from one of the in-vehicle cameras that output the image pattern response that does not match with the image pattern, and to display the alternative composite image.

4. The image processing device according to claim 2, wherein the processor is further configured to display a monochromatic image as the preparation image.

5. The image processing device according to claim 4, wherein the processor is further configured to display a black monochromatic image as the preparation image.

6. The image processing device according to claim 3, wherein the processor is further configured to display a monochromatic image as the preparation image.

7. The image processing device according to claim 6, wherein the processor is further configured to display a black monochromatic image as the preparation image.

8. The image processing device according to claim 2, wherein the processor is further configured to display a layout image that indicates a display position of the composite image as the preparation image.

9. The image processing device according to claim 3, wherein the processor is further configured to display a layout image that indicates a display position of the composite image as the preparation image.

10. The image processing device according to claim 1, wherein when at least one of the image pattern responses does not match with the image pattern, the processor is further configured to generate an alternative composite image using a certain alternative image instead of the input image input from one of the in-vehicle cameras that output the image pattern response that does not match with the image pattern, and to display the alternative composite image.

11. The image processing device according to claim 10, wherein the processor is further configured to display a monochromatic image as the preparation image.

12. The image processing device according to claim 11, wherein the processor is further configured to display a black monochromatic image as the preparation image.

13. The image processing device according to claim 10, wherein the processor is further configured to display a layout image that indicates a display position of the composite image as the preparation image.

14. The image processing device according to claim 1, wherein the processor is further configured to display a monochromatic image as the preparation image.

15. The image processing device according to claim 14, wherein the processor is further configured to display a black monochromatic image as the preparation image.

16. The image processing device according to claim 1, wherein the processor is further configured to display a layout image that indicates a display position of the composite image as the preparation image.

17. An image processing method, comprising:
specifying, as an image pattern for each of a plurality of in-vehicle cameras, an image area that is obtained by selecting a certain area from among image areas of an image captured by the corresponding in-vehicle camera and is to be output as an input image of the corresponding in-vehicle camera;

in response to the image pattern being specified, receive the image areas respectively transmitted from the plurality of in-vehicle cameras along with respective image pattern responses;

generating a composite image that is a surrounding image of a vehicle viewed from a virtual viewpoint, based on the image areas received from the plurality of in-vehicle cameras;

determining whether all of the image pattern responses transmitted from the in-vehicle cameras match with the specified image pattern; and displaying a certain preparation image on the display unit when a display switching condition to the composite image is satisfied, and displaying the composite image on the display unit instead of the preparation image, when it is determined that all of the image pattern responses match with the specified image pattern.

\* \* \* \* \*